US005581168A

United States Patent [19]
Rozman et al.

[11] Patent Number: 5,581,168
[45] Date of Patent: Dec. 3, 1996

[54] STARTER/GENERATOR SYSTEM WITH DC LINK CURRENT CONTROL

[75] Inventors: Gregory I. Rozman, Rockford; Albert L. Markunas, Roscoe; Alexander Cook, Belvidere; Vietson Nguyen, Rockford, all of Ill.

[73] Assignee: Sundstrand Corporation, Rockford, Ill.

[21] Appl. No.: 290,436

[22] Filed: Aug. 15, 1994

Related U.S. Application Data

[63] Continuation of Ser. No. 161,797, May 12, 1993, abandoned.

[51] Int. Cl.[6] .................................................. H02P 7/00
[52] U.S. Cl. ........................ 318/723; 290/22; 322/32; 318/277
[58] Field of Search ................................. 318/140, 157, 318/158, 767, 768, 801, 803, 716–764, 276, 277; 363/37, 40, 41, 45, 49, 55, 56; 290/4 R, 10, 11, 18, 22, 27, 31, 32; 322/10–16, 29, 32, 40

[56] References Cited

U.S. PATENT DOCUMENTS

| | | |
|---|---|---|
| 3,775,974 | 12/1973 | Silver . |
| 3,902,073 | 8/1975 | Lafuze . |
| 3,908,161 | 9/1975 | Messenger . |
| 4,093,869 | 6/1978 | Hoffman et al. . |
| 4,295,085 | 10/1981 | Lafuze . |
| 4,354,126 | 10/1982 | Yates . |
| 4,456,830 | 6/1984 | Cronin . |
| 4,473,752 | 9/1984 | Cronin . |
| 4,684,081 | 8/1987 | Cronin . |
| 4,687,961 | 8/1987 | Horber . |
| 4,694,210 | 9/1987 | Elliott et al. . |
| 4,708,030 | 11/1987 | Cordner . |
| 4,743,777 | 5/1988 | Shilling et al. . |
| 4,772,802 | 9/1988 | Glennon et al. . |
| 4,777,367 | 10/1988 | Dishner et al. ..................... 290/38 R |
| 4,808,903 | 2/1989 | Matsui et al. . |
| 4,841,216 | 6/1989 | Okada et al. . |
| 4,868,406 | 9/1989 | Glennon et al. . |
| 4,900,231 | 2/1990 | Kennedy . |
| 4,908,565 | 3/1990 | Cook et al. ........................ 322/10 |
| 4,933,623 | 6/1990 | Fox . |
| 4,935,686 | 6/1990 | Stacey . |
| 4,939,441 | 7/1990 | Dhyanchand . |
| 4,942,493 | 7/1990 | Rozman et al. . |
| 4,947,100 | 8/1990 | Dhyanchand et al. . |
| 4,949,021 | 8/1990 | Rozman et al. . |
| 4,959,595 | 9/1990 | Nishimura . |
| 4,967,334 | 10/1990 | Cook et al. . |
| 4,968,926 | 11/1990 | Dhyanchand . |

(List continued on next page.)

FOREIGN PATENT DOCUMENTS 2206751  1/1989  United Kingdom .

OTHER PUBLICATIONS

E. Iizuka, et al., *IEEE Transactions on Industry Applications*, vol. 1A–21, No. 4, May/Jun. 1985.

Furuhashi, et al., *IEEE Transactions on Industrial Electronics*, vol. 39, No. 2, Apr. 1992.

*Primary Examiner*—Jonathan Wysocki
*Attorney, Agent, or Firm*—Jeffery J. Makeever

[57] ABSTRACT

A synchronous generator usable in both a starting mode of operation and a generating mode of operation includes a permanent magnet generator having a permanent magnet and an armature winding rotatable with respect to the permanent magnet, an exciter portion having an exciter armature winding and an exciter field winding rotatable with respect to the exciter armature winding, and a main generator portion having a main generator armature winding and a main generator field winding rotatable with respect to the main generator armature winding. An inverter is coupled to supply power to the main generator portion armature winding via a DC link during the starting mode of operation, and a controller is coupled to the DC link for controlling the magnitude of the DC link current provided to the inverter during the starting mode of operation.

17 Claims, 6 Drawing Sheets

U.S. PATENT DOCUMENTS

| | | |
|---|---|---|
| 4,988,939 | 1/1991 | Reichard et al. . |
| 4,992,721 | 2/1991 | Latos . |
| 5,008,801 | 4/1991 | Glennon . |
| 5,012,177 | 4/1991 | Dhyanchand et al. . |
| 5,013,929 | 5/1991 | Dhyanchand . |
| 5,015,927 | 5/1991 | Reichard . |
| 5,015,941 | 5/1991 | Dhyanchand ............................ 322/10 |
| 5,028,803 | 7/1991 | Reynolds ................................. 290/31 |
| 5,040,366 | 8/1991 | Schulze . |
| 5,051,670 | 9/1991 | De Piola . |
| 5,055,700 | 10/1991 | Dhyanchand ............................ 290/31 |
| 5,055,764 | 10/1991 | Rozman et al. ......................... 322/10 |
| 5,068,590 | 11/1991 | Glennon et al. ......................... 322/10 |
| 5,079,494 | 1/1992 | Reichard . |
| 5,097,195 | 3/1992 | Raad et al. ................................. 322/10 |
| 5,113,125 | 5/1992 | Stacey . |
| 5,132,604 | 7/1992 | Shimane et al. ......................... 322/10 |
| 5,140,245 | 8/1992 | Stacey ..................................... 318/723 |
| 5,175,439 | 12/1992 | Harer et al. ........................... 363/37 X |
| 5,200,644 | 4/1993 | Kobayashi et al. ................. 318/441 X |
| 5,239,251 | 8/1993 | Lauw ..................................... 318/767 |
| 5,281,905 | 1/1994 | Dhyanchand et al. ................... 322/32 |

STARTER/GENERATOR SYSTEM WITH DC LINK CURRENT CONTROL

This is a Continuation of U.S. application Ser. No. 08/161,797, filed May 12, 1993, now abandoned.

TECHNICAL FIELD

The present invention relates to a starter/generator system in which a synchronous generator having main generator portion armature and field windings is operable in a starting mode by controlling the DC link current provided to an inverter connected to supply power to the main generator portion armature windings.

BACKGROUND ART

Various types of starter/generator systems operable in both starting and generating modes have been utilized. One such system is a variable-speed, constant-frequency (VSCF) system in which a brushless, three-phase synchronous generator operates in a generating mode to convert variable-speed motive power supplied by a prime mover into variable-frequency AC power. The variable-frequency power is rectified and provided over a DC link to a controllable static inverter. The inverter is operated to produce constant-frequency AC power, which is then supplied over a load bus to one or more loads. The generator can also be operated as a motor in a starting mode to convert electrical power supplied by a power source into motive power which may in turn be provided to the prime mover to bring it up to self-sustaining speed.

One example of a starter/generator system operable in both starting and generating modes is described in U.S. Pat. No. 3,902,073 to Lafuze. In that patent, power is provided to the synchronous generator during the start mode via a source of 400 hertz AC power.

In certain circumstances, such as during an in-air aircraft engine restart, it is advantageous to provide power to the starter/generator system via a source of battery power provided on the aircraft having a relatively low voltage, such as 24 or 28 volts. In such cases, it is desirable to maximize the efficiency of the system during the start mode to minimize the size and weight of the battery required.

In a starter/generator system powered by a battery during the start mode, the battery voltage is typically boosted by a DC/DC converter to a constant higher voltage, such as 270 volts, and is then provided via a DC link to a pulse-width modulated (PWM) inverter coupled to deliver power to the main generator portion armature winding. As the prime mover is accelerated, the frequency and duty cycle of the PWM inverter are gradually increased. Although such a starter/generator system may be generally satisfactory, the efficiency of the system is not optimal due to the DC/DC conversion of the relatively low battery voltage to a much higher constant DC link voltage and the variable duty cycle of the PWM inverter.

SUMMARY OF THE INVENTION

The present invention is directed to a starter/generator system in which a synchronous generator is operable in a starting mode by controlling the DC link current provided to an inverter connected to supply power to the main generator portion armature windings. The synchronous generator has a main generator portion with an armature winding and a field winding rotatable with respect to the armature winding.

2

A control for the synchronous generator includes an inverter coupled to supply power to the main generator portion armature windings via a DC link during the starting mode of operation. An inverter controller coupled to the DC link controls the magnitude of the DC link current provided to the inverter during the starting mode of operation.

The control may include a current sensor coupled to the DC link to generate a sensed current signal relating to the magnitude of the DC link current and a comparator that compares the sensed current signal with a current reference signal, and may provide a variable controlled voltage across the DC link based upon the magnitudes of the sensed current signal and the current reference signal.

The current reference signal may be generated based on the relative magnitudes of the voltage provided by a battery connected to the DC link and a predetermined percentage of the rated voltage of the battery. Alternatively, the current reference signal may be based on the relative magnitudes of a speed reference signal representing the desired rotational speed of the synchronous generator rotor at any given time and the sensed rotational speed of the rotor.

DESCRIPTION OF THE PREFERRED EMBODIMENTS

Figure 1:
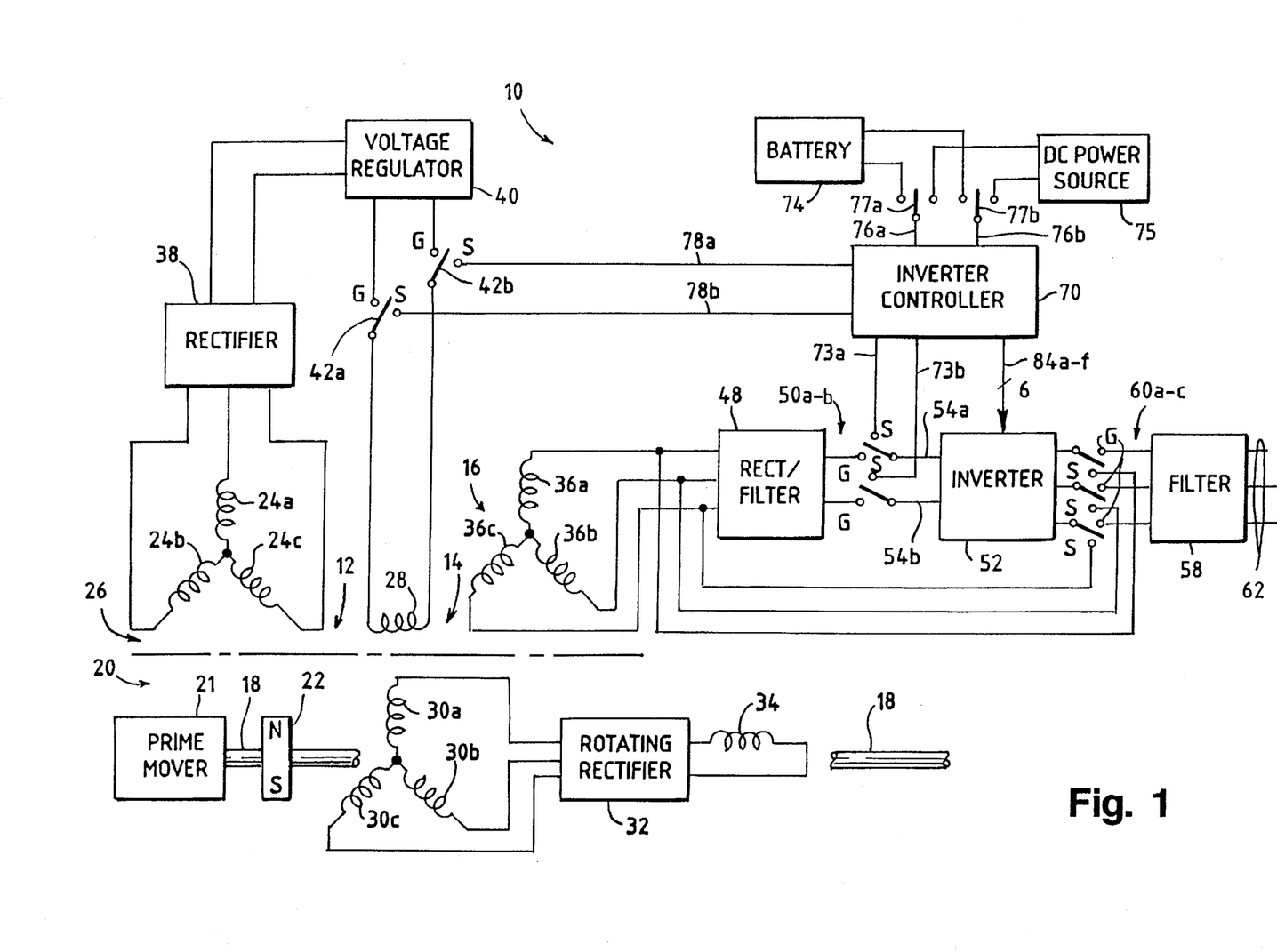
FIG. 1 is a combined block and schematic diagram of a preferred embodiment of a brushless, synchronous generator in accordance with the present invention.

A preferred embodiment of the present invention is shown in FIG. 1. Referring now to FIG. 1, an electromagnetic machine in the form of a brushless, synchronous generator 10 includes a permanent magnet generator (PMG) 12, an exciter portion 14 and a main generator portion 16. The generator 10 further includes a motive power shaft 18 connected to a rotor 20 of the generator 10. The rotor 20 is attached to a prime mover 21, such as a gas turbine jet engine, and carries one or more permanent magnets 22 which form poles for the PMG 12. The prime mover 21 and the generator 10 may comprise portions of an aircraft auxiliary power unit (APU). Rotation of the motive power shaft 18 causes relative movement between the magnetic flux produced by the permanent magnet 22 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. A set of three-phase main generator portion armature windings 36a–36c are disposed in the stator 26.

The generator 10 may be operated in a generating mode, during which PMG armature windings 24a–24c are coupled through a rectifier 38 and voltage regulator 40 to the exciter portion field winding 28 via a pair of contactors or mode switches 42a–b. As the prime mover 21 rotates the motive power shaft 18, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c. Those three-phase voltages are provided to a rectifier/filter 48 that generates a DC voltage and provides that voltage to a main inverter 52 via a DC link 54 and a pair of mode switches 50a–b. The main inverter 52 generates three-phase, constant-frequency AC power which is provided to a filter 58 via three mode switches 60a–c. After the three-phase AC power is filtered, it is provided to a load bus 62 for distribution.

The main inverter 50 includes six controllable transistor power switches and six flyback diodes connected in a conventional bridge configuration. During the generate mode, the power switches are switched at a constant rate so that the DC power generated on the DC link 54 by the main generator portion armature windings 36a–c is converted to constant-frequency AC power and provided to the load bus 62.

During the starting mode, the switches 60a–c are positioned to connect main inverter 52 to supply variable-frequency power to the main generator portion 36a–c armature windings to accelerate the generator 10 coupled to the prime mover 21. The main inverter 52 generates that variable-frequency power from a variable controlled voltage provided across the DC link 54, which voltage is generated by an inverter controller 70 and provided to the DC link 54 via mode switches 50a–b and lines 73a–b. The inverter controller 70 may receive its power either from a battery 74 or from another source of DC power 75 via a pair of switches 77a–b connected to a pair of lines 76a–b. The DC power from source 75 may be generated by rectifying the AC power produced by an AC power source, such as a 400 hertz, 115 volt power source. The inverter controller 70 also generates six drive signals that are provided to the six power switches of the main inverter 52 via lines 84a–f to accelerate the motive power shaft 18. The inverter controller 70 may also be connected to supply power to the exciter field winding 28 via a pair of lines 78a–b and the switches 42a–b during the starting mode.

During the starting mode of operation, the inverter controller 70 converts the DC power provided from either the battery 74 or the DC power source 75 into a variable controlled voltage which is provided to the DC link 54a–b via the switches 50a–b. The battery 74 would typically be utilized to provide power when the DC power source 75 is not present or unavailable, such as during an in-air start.

Figure 2:
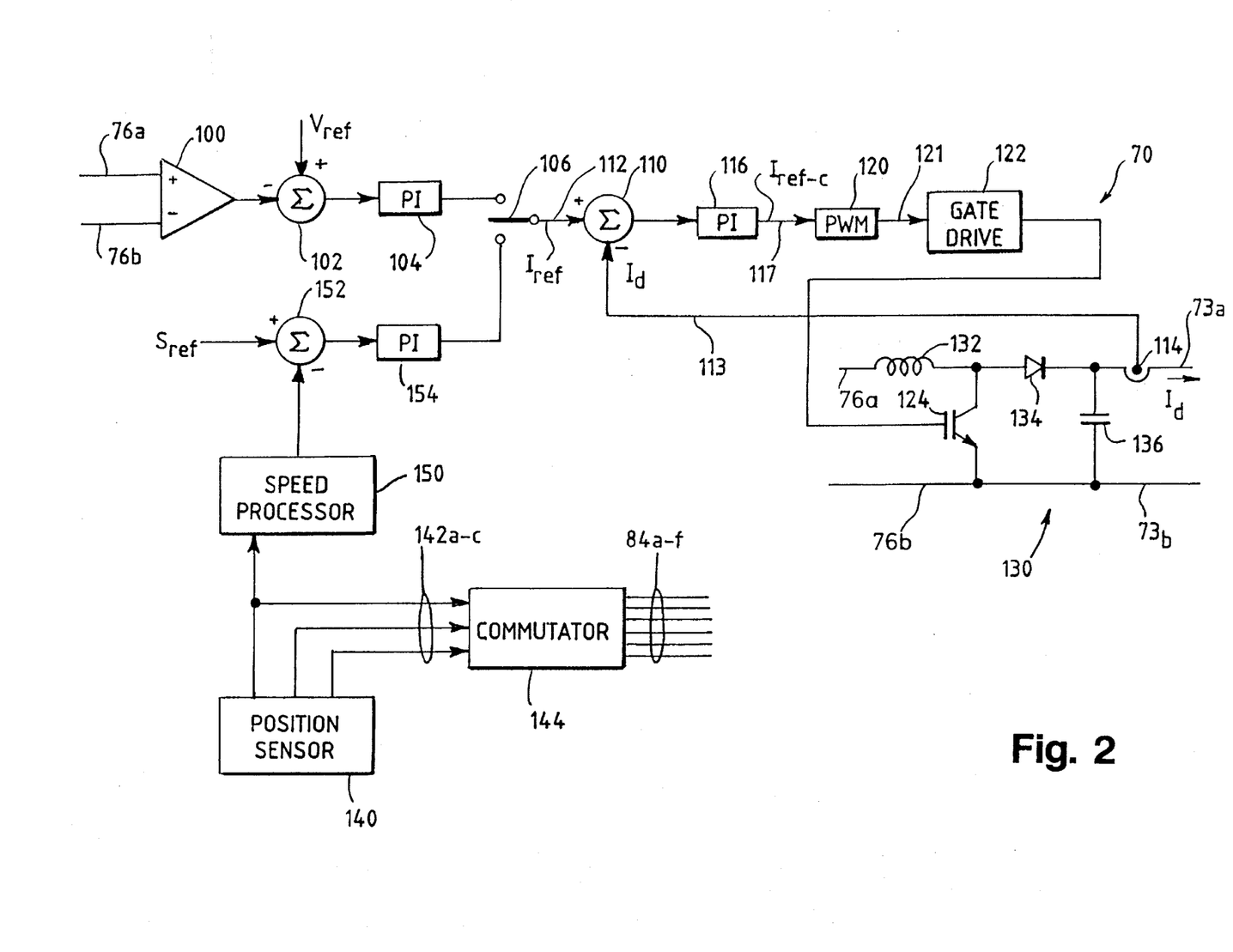
FIG. 2 is a diagram of one embodiment of an inverter controller shown schematically in FIG. 1.

FIG. 2 illustrates one embodiment of the inverter controller 70, which operates by causing an optimum magnitude of DC link current to be provided from the battery 74 when the battery is used during the starting mode. As is known, the voltage supplied by a battery drops as more current is drawn from the battery. The optimum DC link current magnitude provided by this embodiment of the controller 70 is that amount of current which causes the loaded battery voltage to drop to one-half of its rated (unloaded) voltage. Alternatively, due to design constraints, a voltage reference $V_{ref}$ representing the commanded loaded battery voltage can be selected to be a different fixed percentage of the rated battery voltage.

Referring to FIG. 2, the inverter controller 70 includes a difference amplifier 100 connected to the lines 76a–b that generates a signal representing the loaded voltage being provided by the battery 74. That voltage is compared with the reference voltage $V_{ref}$ via a difference amplifier or summer 102, which generates a difference signal representing the difference between the reference voltage $V_{ref}$ and the loaded battery voltage. The difference signal is amplified by a proportional-only (P) or proportional-integral (PI) amplifier 104, and then is provided to a first terminal of a switch 106 as a current reference signal $I_{ref}$.

The reference current $I_{ref}$ is provided to one input of a summer or difference amplifier 110 via a line 112. The other input of the summer 110 is provided by a line 113 with a sensed current signal $I_d$ representing the magnitude of the DC link current as sensed by a sensor 114. The summer 110 generates a signal representing the difference between the sensed DC link current and the current reference $I_{ref}$, and that difference signal is amplified by a PI amplifier 116 and provided via a line 117 to a pulse-width modulator (PWM) 120. The PWM 120 generates a variable duty cycle signal which is provided via a line 121 to a gate drive circuit 122 connected to the base of a transistor 124 of a DC/DC converter 130.

When the battery 74 is utilized during starting, the DC/DC converter 130 is connected to the battery 74 via the switches 77a–b and lines 76a–b and to the DC link 54 via the lines 73a–b and switches 50a–b. The DC/DC converter 130 includes an inductor 132, a diode 134, and a capacitor 136 coupled across the lines 73a–b. The transistor 124 is selectively switched by the gate drive signal generated by the circuit 122 to provide the desired amount of DC link current $I_d$.

In operation, if the loaded battery voltage is greater than the reference voltage $V_{ref}$, meaning that the battery can supply more current, the current reference $I_{ref}$ is increased. Similarly, if the loaded battery voltage is less than $V_{ref}$, the current reference $I_{ref}$ is decreased. The amount of DC link current is then controlled to substantially match the reference current $I_{ref}$ by controlling the amount of time the transistor 124 is switched on, which is determined by the variable duty cycle signal generated by the PWM 120.

The controller 70 optionally includes a position sensor 140 which generates three phased signals via lines 142a–c representing the angular position of the rotor 20 with respect to the stator 26, and thus the position of the main generator portion armature windings 36a–c with respect to the field winding 34. The three phased signals are provided to a commutator 144, which generates drive signals for driving the power switches of the main inverter 52. As is conventional, the power switches are driven at an increasing frequency as the rotor 20 is accelerated during the starting mode of operation. The particular manner in which the drive signals are generated is not considered to be a feature of the present invention.

When the generator 10 is started from power supplied from the DC power source 75 instead of the battery 74, the DC link current may be controlled based upon a speed reference signal $S_{ref}$ representing the rotational speed of the rotor 20. In accordance with that alternative, a sensed speed signal generated by a speed processor 150 is compared with a speed reference signal $S_{ref}$ by a summer or difference amplifier 152, which generates a signal representing the difference between the speed reference signal and the sensed speed signal. That difference signal is provided to a PI (or P) amplifier 154, which generates an alternative current reference signal $I_{ref}$ at a second terminal of the switch 106. The control of the DC link current based upon the alternative current reference signal is similar to that described above in connection with the battery current reference signal.

Figure 3:
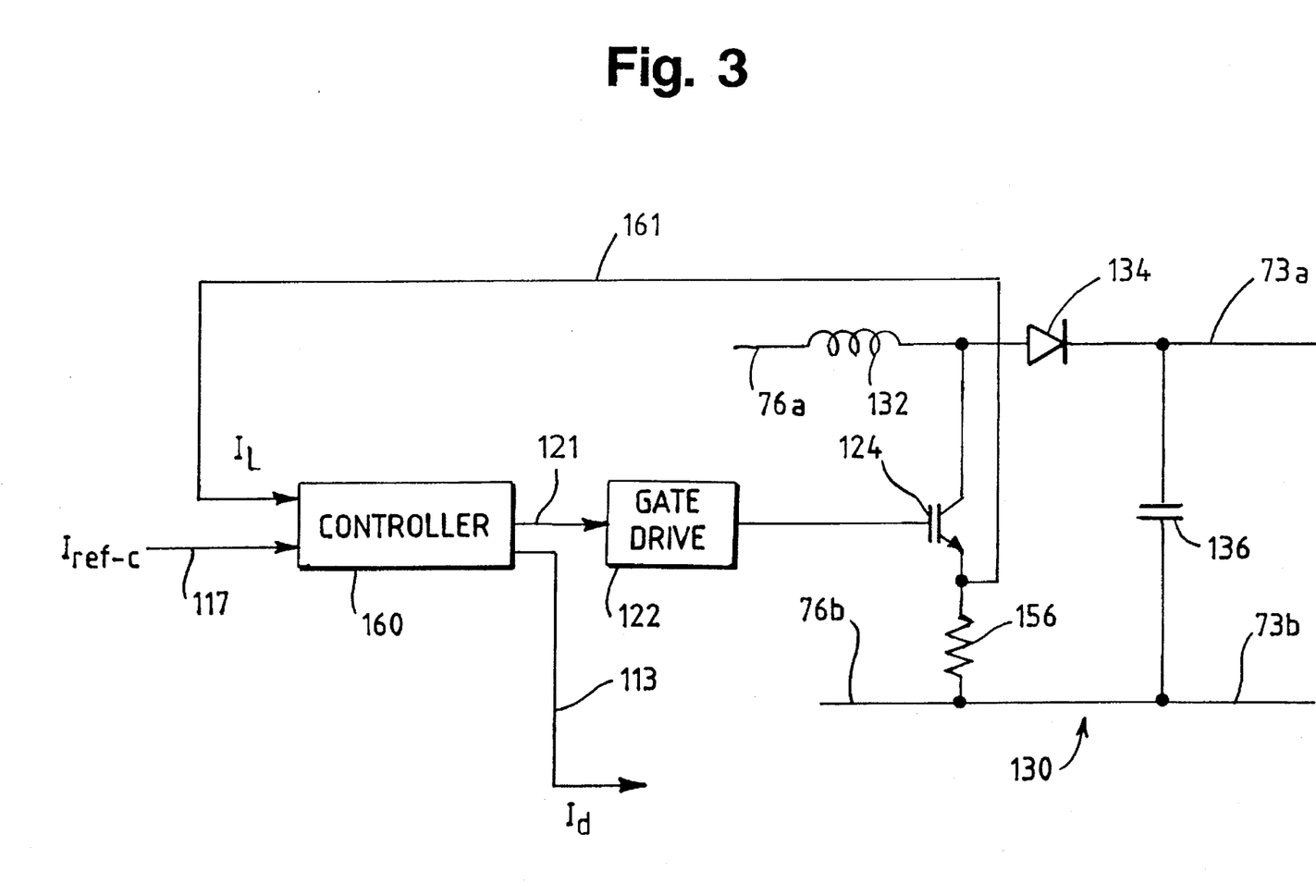
FIG. 3 illustrates a portion of an alternative embodiment of the inverter controller of FIG. 2.

A portion of a second embodiment of the inverter controller 70 is shown in FIG. 3. The embodiment of FIG. 3 is somewhat similar to that of FIG. 2, except that the DC link current $I_d$ is generated based on the average inductor current $I_L$ which is sensed by a resistor 156. As shown in FIG. 3, a controller 160 is responsive to the magnitude of a signal $I_{ref-c}$ generated on the line 117 and an inductor current signal $I_L$ on a line 161 and provides a variable duty cycle signal to the gate drive circuit 122 to controllably switch the transistor 124. The controller 160 also generates the DC link current signal $I_d$ on the line 113.

Figure 3A:
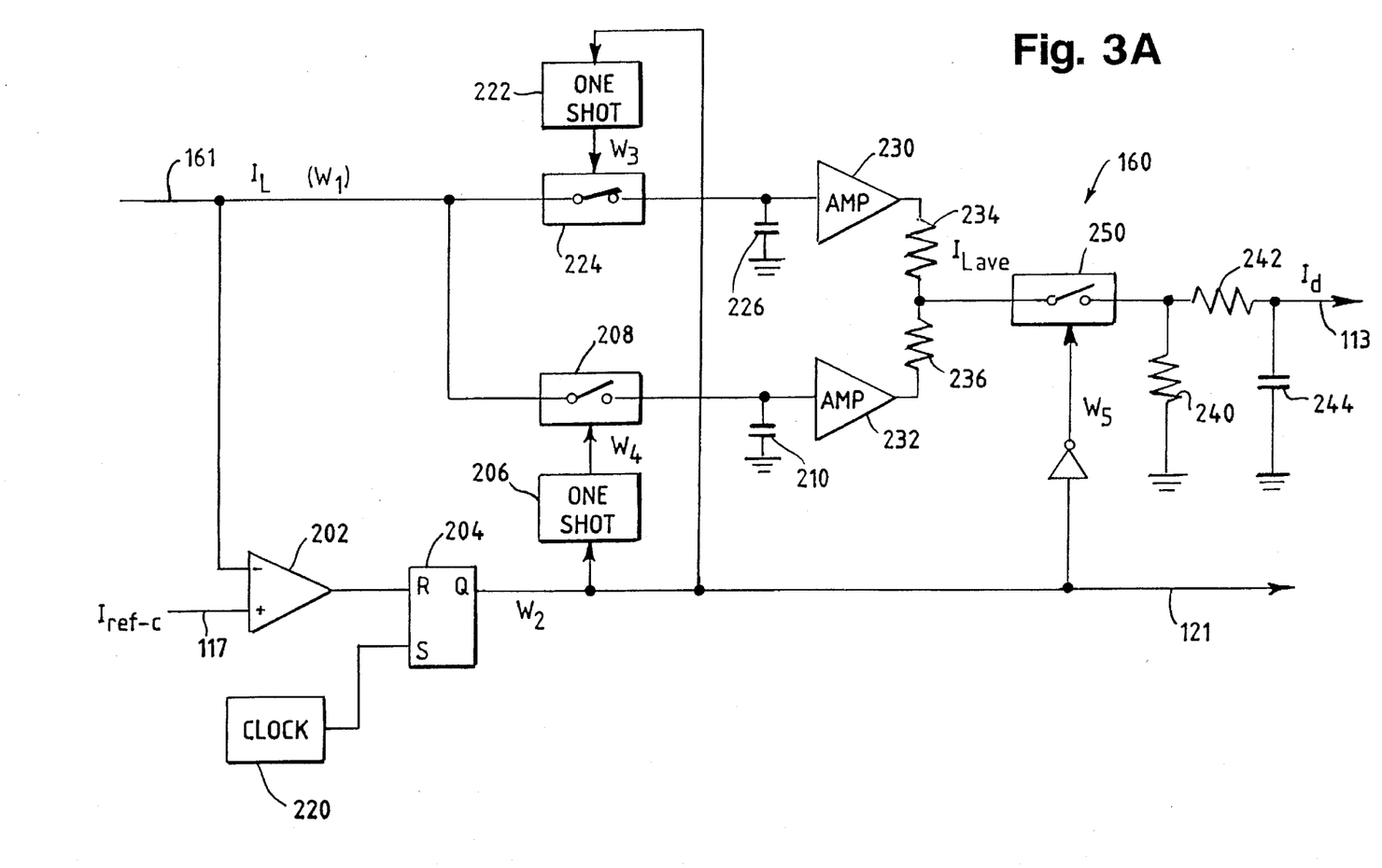
FIG. 3A is a diagram of the controller shown schematically in FIG. 3.
Figure 3B:
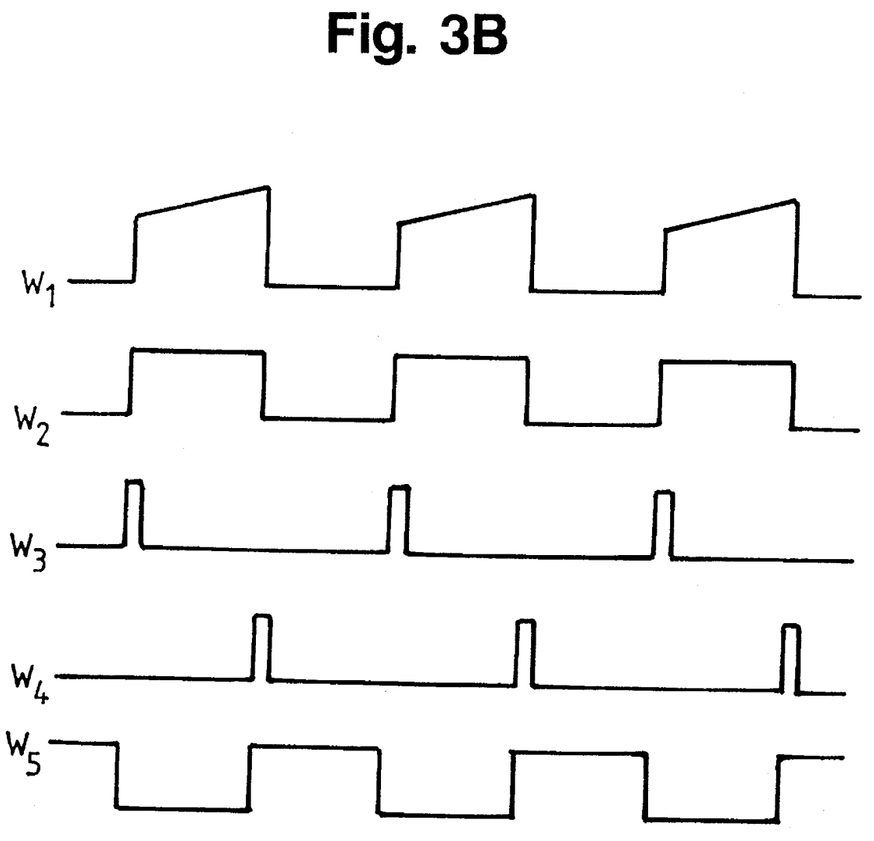
FIG. 3B illustrates a number of waveforms generated during the operation of the controller of FIG. 3A.

A circuit diagram of the controller 160 is shown in FIG. 3A, and a number of waveforms generated during the operation of the circuit of FIG. 3A are shown in FIG. 3B. Referring to FIG. 3A, the controller 160 includes a comparator 202 which compares a signal representative of the sensed current $I_L$ via the line 161 and compares it to the reference current signal $I_{ref-c}$. The signal on the line 161 has a shape corresponding to that of waveform $W_1$ of FIG. 3B. When the magnitude of the $I_L$ signal becomes as large as the magnitude of the $I_{ref-c}$ signal, the output of the comparator 202 causes an SR flip-flop 204 to change state from a high level to a low level. The output of the SR flip-flop 204, which is illustrated in FIG. 3B as waveform $W_2$, is connected to the line 121 which controls the gate drive circuit 122 (FIG. 3) which turns the transistor 124 on and off. Each time the transistor 124 is turned off, the magnitude of the signal on the line 161 becomes zero since there is no current through the transistor 124 and thus no voltage across the resistor 156.

The output of the SR flip-flop 204 is provided to a falling-edge-triggered one-shot 206, which generates an output signal the shape of which is illustrated in FIG. 3B as waveform $W_4$. Each time the waveform $W_2$ falls to zero, the one-shot 206 generates a short pulse which closes a switch 208, causing a signal representing the largest or peak magnitude of the inductor current $I_L$ to be stored in a sample-and-hold capacitor 210.

A clock 220 connected to the set input of the SR flip-flop 204 periodically causes the output waveform $W_2$ of the flip-flop 204 to change state again by rising to a relatively high level. As a result, the transistor 124 is turned back on and a rising-edge-triggered one-shot 222 generates a short pulse which closes a switch 224, causing a signal representing the smallest magnitude of the inductor current $I_L$ to be stored in a sample-and-hold capacitor 226.

In operation, each of the sample-and-hold capacitors 210, 226 alternately stores a signal representing the largest and smallest values, respectively, of the inductor current. A signal $I_{Lave}$ representing the average value of those two periodically stored values is generated by an amplifier circuit comprising two amplifiers 230, 232 and two resistors 234, 236.

The current signal $I_d$ provided on the line 113 is generated from the average inductor current signal $I_{Lave}$ by a filter circuit comprising a pair of resistors 240, 242 and a capacitor 244. An optional switch 250 may be used to connect the averaging circuit to the filter circuit only during certain times, such as when the transistor 124 is off.

Figures 4, 5:
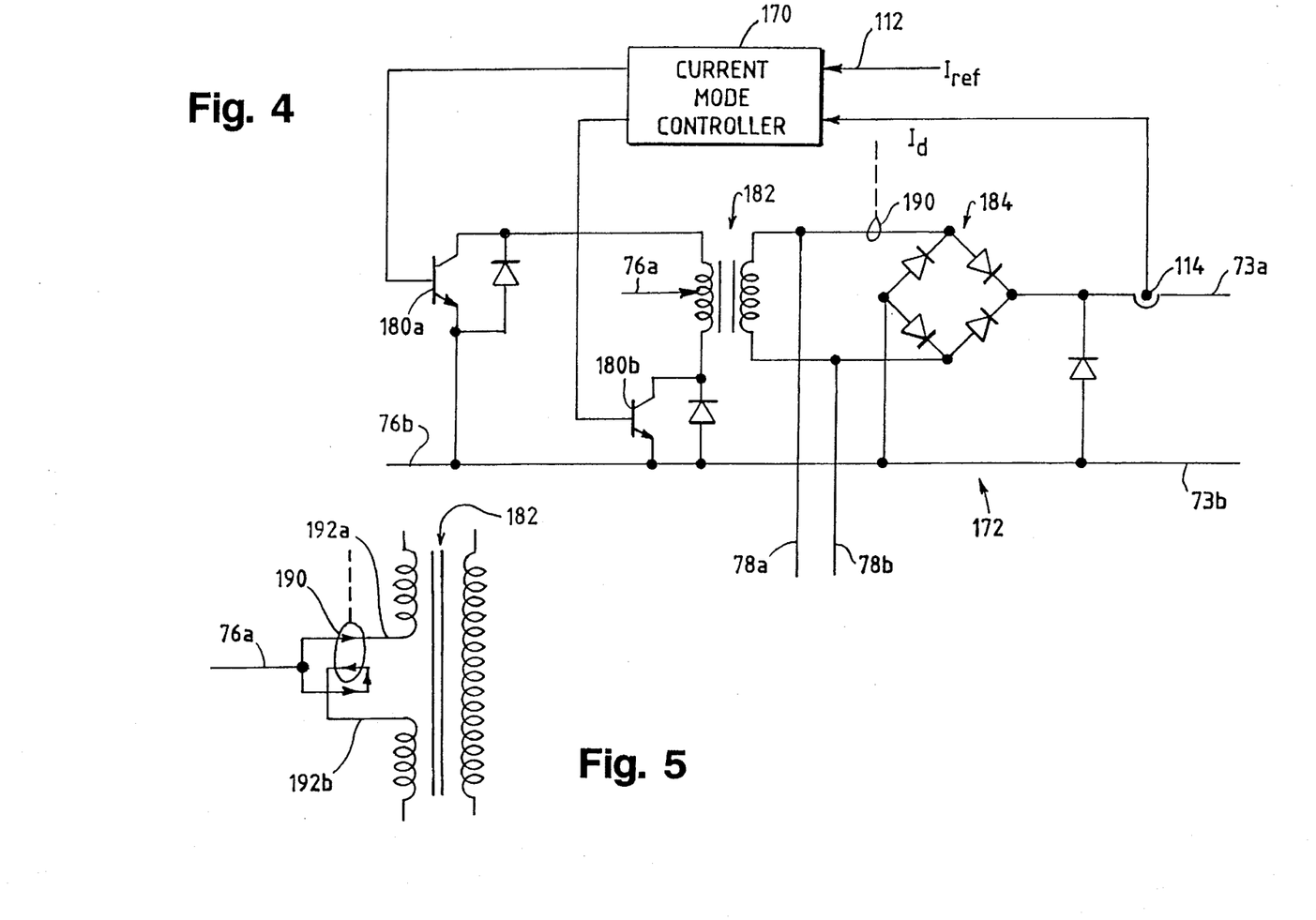
FIG. 4 illustrates a portion of a second alternative embodiment of the inverter controller of FIG. 2.
FIG. 5 illustrates a portion of an alternative embodiment of FIG. 4.

A portion of another embodiment of the inverter controller 70 is shown in FIG. 4. In that embodiment, a current mode controller 170 controls the magnitude of the DC link current based upon the relative magnitudes of the current reference signal $I_{ref}$ on the line 112 and the sensed current signal $I_d$ generated by the current sensor 114. The controller 170 is connected to a DC/DC converter 172 which includes a pair of switching transistors 180a–b coupled to a transformer 182 having a primary winding connected either to the battery 74 or other power source 75 via the lines 76a–b and a secondary winding connected to a diode circuit 184.

The current mode controller 170 operates by controlling the duty cycle of the transistors 180a–b so that the DC link current $I_d$ is controlled to the magnitude of the current reference $I_{ref}$. The current mode controller 170 could be either a PWM or a hysteresis controller the operation of which is described above. AC current may be supplied from the DC/DC converter 172 to the exciter field winding 28. Alternatively, power may be supplied to the exciter field winding 28 via the lines 78a–b.

Instead of sensing the magnitude of the DC link current directly with the DC current sensor 114, a current transformer may be used since current transformers, which detect AC current, are generally less expensive than DC current sensors. A conventional current transformer 190 is schematically shown connected to sense the AC current generated by the secondary winding of the transformer 182 and generates a signal representative of the DC link current based upon the sensed AC current. Alternatively, as shown in FIG. 5, the current transformer 190 may be coupled to sense the AC current through a pair of lines 192a–b coupled to the primary winding of the transformer 182, with the direction of the current in the lines 192a–b being indicated by the arrows. Instead of using the DC current sensor 114 in the embodiment of FIG. 2, a current transformer could be used by connecting it to sense the AC current generated in the DC/DC converter 130.

Numerous additional modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for a synchronous generator having a main generator portion with an armature winding and a field winding rotatable with respect to said armature winding, said synchronous generator being attached directly to a prime mover and usable in a starting mode of operation whereby the main generator portion field winding is accelerated with respect to the main generator portion armature winding to directly accelerate the prime mover, said control comprising:

an inverter coupled to the main generator portion armature winding to supply power to said main generator portion armature winding during the starting mode of operation;

a DC link connected to said inverter, said DC link providing a DC link current to said inverter during the starting mode of operation;

a source of DC power coupled to said DC link, said source of DC power providing an output voltage to said DC link;

a controller coupled to said DC link for controlling to an optimum level the magnitude of the DC link current provided to said inverter by said DC link during the starting mode of operation whereby said main generator portion armature winding is accelerated with respect to said main generator portion field winding thereby directly accelerating the prime mover; and wherein said optimum level is determined as that current level which results in a fixed percentage drop in said output voltage of said source of DC power.

2. A control as defined in claim 1 additionally comprising:

a current sensor that generates a sensed current signal relating to the magnitude of said DC link current;

a comparator that compares said sensed current signal with a current reference signal; and means for providing a variable controlled voltage across said DC link based upon the magnitudes of said sensed current signal and said current reference signal.

3. A control as defined in claim 2 wherein said voltage providing means comprises a DC/DC converter.

4. A control as defined in claim 1 wherein said current sensor comprises a current transformer.

5. A control as defined in claim 1 wherein said controller comprises:

a comparator that compares said DC link current with a current reference; and a DC/DC converter coupled to said comparator that provides a voltage to said inverter based upon the magnitudes of said DC link current and said current reference.

6. A control as defined in claim 1 wherein said source of DC power coupled to said DC link is a source of battery power and wherein the optimum magnitude of said DC link current is controlled to a value which results in a drop in the output voltage of said source of battery power to one-half of the rated voltage of said source of battery power.

7. A control as defined in claim 1 additionally comprising means for generating a speed signal relating to the speed of rotation of said main generator portion armature winding relative to said main generator field winding and wherein said DC link current is controlled based upon the relative magnitudes of said speed signal and a speed reference signal.

8. A synchronous generator directly coupled to a prime mover usable in both a starting mode of operation and a generating mode of operation, said synchronous generator comprising:

a permanent magnet generator having a permanent magnet and an armature winding rotatable with respect to said permanent magnet;

an exciter portion having an exciter armature winding and an exciter field winding rotatable with respect to said exciter armature winding;

a main generator portion having a main generator armature winding and a main generator field winding rotatable with respect to said main generator armature winding;

means for providing power to said main generator portion armature winding during said starting mode of operation, said means for providing power comprising:

an inverter coupled to the main generator portion armature winding to supply power to said main generator portion armature winding during the starting mode of operation;

a DC link connected to said inverter, said DC link providing a DC link current to said inverter during the starting mode of operation;

a source of DC power coupled to said DC link, said source of DC power providing an output voltage to said DC link;

control means coupled to said DC link for controlling to an optimum level the magnitude of the DC link current provided to said inverter by said DC link during the starting mode of operation whereby said main generator portion armature winding is accelerated with respect to said main generator portion field winding thereby directly accelerating the prime mover; and wherein said optimum level is determined as that current level which results in a fixed percentage drop in said output voltage of said source of DC power.

9. A synchronous generator as defined in claim 8 wherein said control means comprises:

a comparator that compares said DC link current with a current reference; and a DC/DC converter coupled to said comparator that provides to said inverter a controlled voltage having a magnitude which is based upon the relative magnitudes of said DC link current and said current reference.

10. A synchronous generator as defined in claim 9 wherein said source of DC power coupled to said DC link is a source of battery power, and wherein said current reference has a magnitude generally equal to one-half of the rated voltage of said source of battery power.

11. A synchronous generator as defined in claim 9 additionally comprising means for generating a speed signal relating to the speed of rotation of said main generator portion armature winding relative to said main generator field winding and wherein said current reference has a magnitude based on the difference between said speed signal and a speed reference signal.

12. A synchronous generator as defined in claim 8 additionally comprising:

a rectifier;

a filter; and switching means coupled to said rectifier and said filter, said switching means having a first position during said starting mode of operation in which said main generator portion armature winding is supplied power from said inverter to accelerate said main generator armature winding with respect to said main generator portion field winding to directly accelerate the prime mover and a second position during said generating mode wherein said main generator portion armature winding is connected to said rectifier whereby said main generator portion armature winding provides AC power to said rectifier, said rectifier provides DC power to said inverter, and said inverter provides AC power to said filter.

13. A control for a synchronous generator having a main generator portion with an armature winding and a field winding rotatable with respect to said armature winding, said synchronous generator being directly coupled to a prime mover and usable in a starting mode of operation whereby the main generator portion field winding is accelerated with respect to the main generator portion armature winding by power provided by either a battery or a DC source thereby directly accelerating the prime mover, said control comprising:

a first power source comprising a battery;

a second power source comprising a DC power source;

an inverter coupled to the main generator portion armature winding;

a DC link connected to said inverter, said DC link providing a DC link current to said inverter during the starting mode of operation;

a controller coupled to said DC link for controlling to an optimum level the magnitude of the DC link current provided to said inverter by said DC link during the starting mode of operation whereby said main generator portion armature winding is accelerated with respect to said main generator portion field winding thereby directly accelerating the prime mover; and switching means coupled to said first source of power and said second source of power, said switching means causing either said first source of power or said second source of power to be connected to supply power for generating said DC link current during the starting mode of operation.

14. A method of starting a prime mover directly coupled to a synchronous generator having a main generator portion with an armature winding and a field winding rotatable with respect to said armature winding by providing power to a DC link from a source of DC power, and via the DC link to an inverter coupled to the main generator portion armature winding, said method comprising the steps of:

(a) providing a DC link current to the inverter via the DC link;

(b) generating a sensed current signal relating to the magnitude of the DC link current provided to the inverter;

(c) generating a current reference signal representing the desired magnitude of the DC link current to be provided to the inverter via the DC link, the desired magnitude of the DC link current being relative to a predetermined percentage of rated voltage of the source of DC power supplying the DC link;

(d) providing a variable controlled voltage across the DC link having a magnitude based upon the relative magnitudes of said sensed current signal generated during said step (b) and said current reference signal generated during said step (c).

15. A method as defined in claim 14 wherein said sensed current signal is generated by a DC link current sensor.

16. A method as defined in claim 14 wherein the source providing power to said DC link is a source of battery power and wherein said sensed current reference signal has a magnitude relating to one-half of the rated voltage of a source of battery power.

17. A method as defined in claim 14 additionally comprising the step of (e) generating a sensed speed signal relating to the relative rotational speed of the main generator portion armature winding and the main generator portion field winding and wherein said current reference signal has a magnitude relating to the desired relative rotational speed of the main generator portion armature winding and the main generator portion field winding.

* * * * *